UNITED STATES PATENT OFFICE.

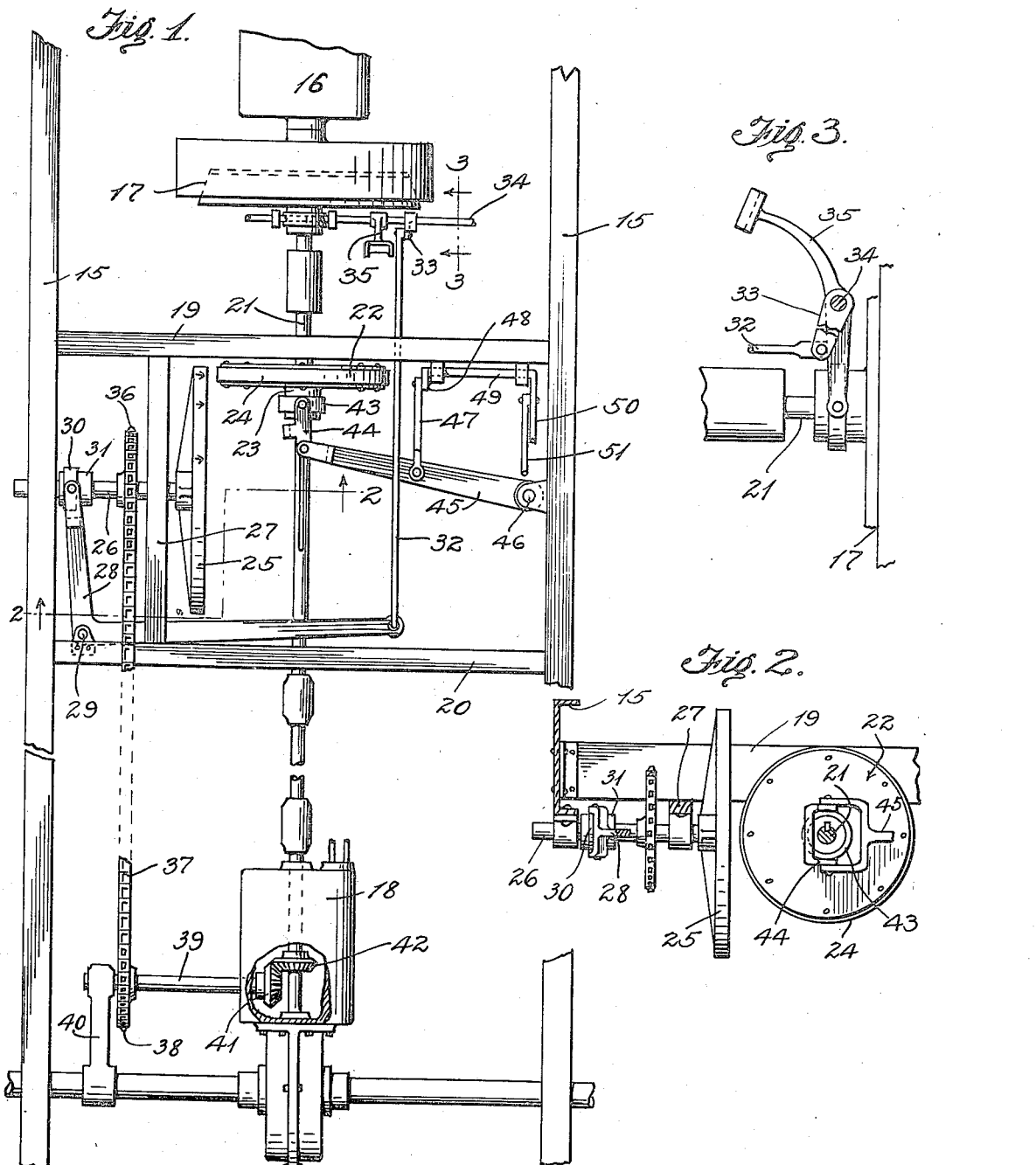

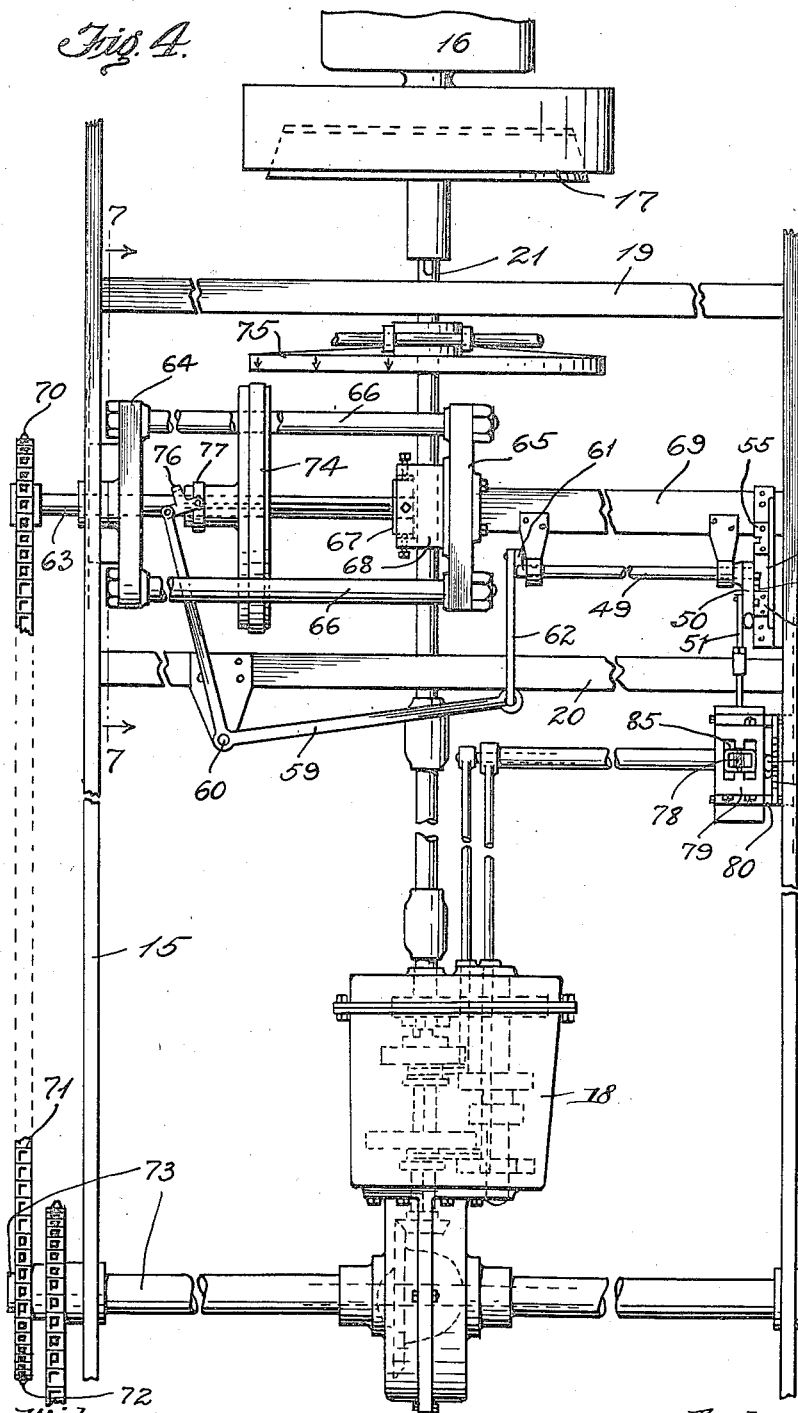
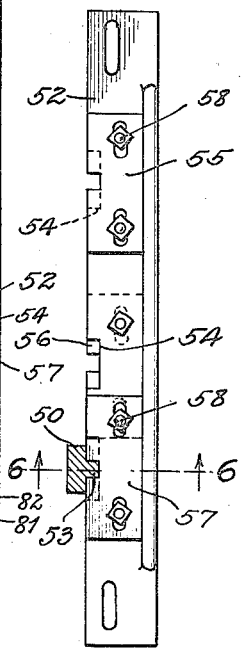
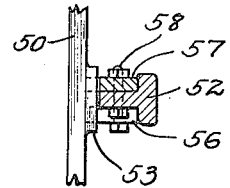

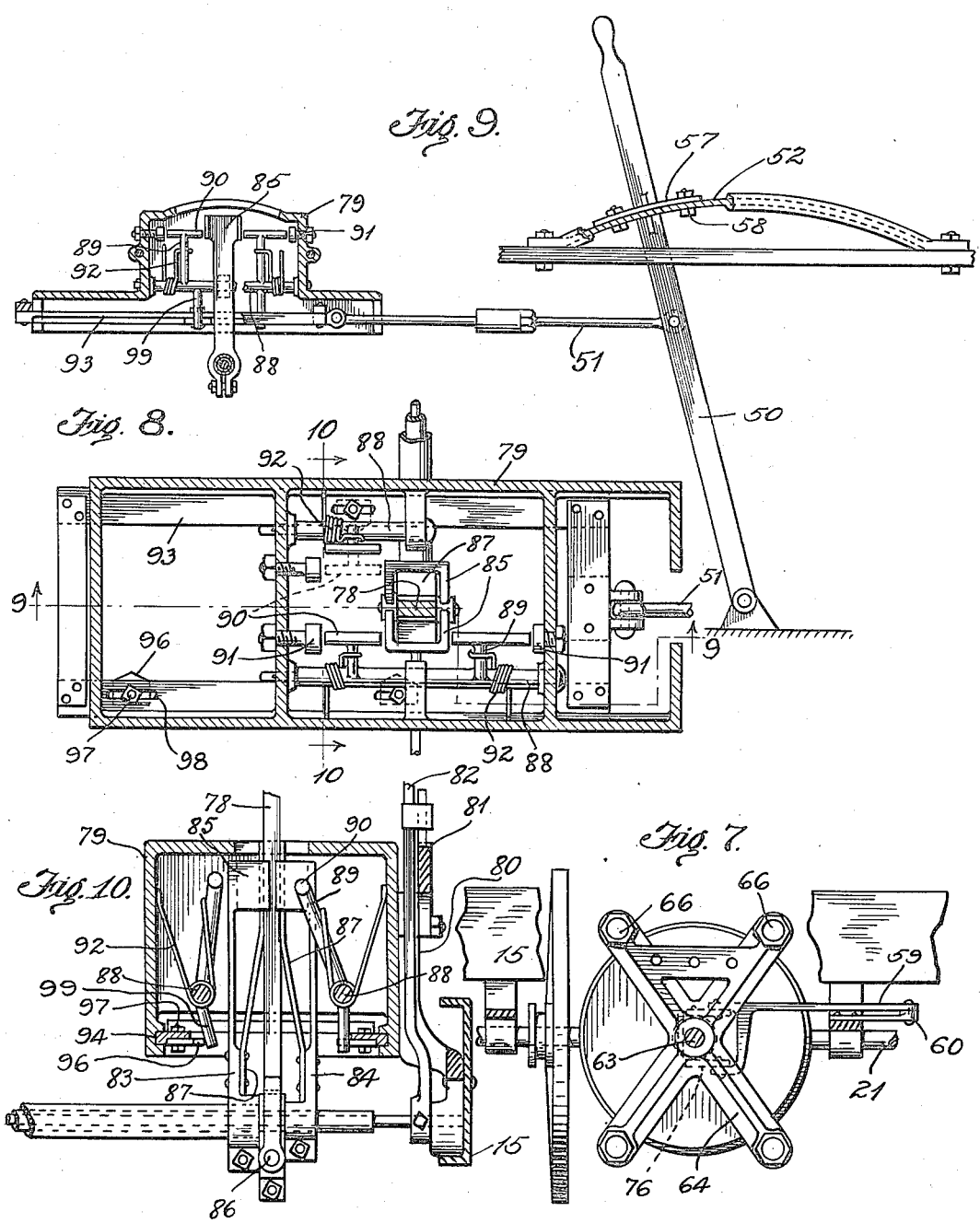

FREDERICK W. WOODHULL, OF ALHAMBRA, CALIFORNIA.

TRANSMISSION SPEED-CONTROLLING MECHANISM.

1,133,690.  Specification of Letters Patent.  Patented Mar. 30, 1915.

Application filed May 7, 1914. Serial No. 836,913.

*To all whom it may concern:*

Be it known that I, FREDERICK W. WOODHULL, a citizen of the United States, residing at Alhambra, in the county of Los Angeles and State of California, have invented certain new and useful Improvements in Transmission Speed-Controlling Mechanism, of which the following is a specification.

This invention relates to improvements in transmission, speed-controlling mechanism for motor-driven vehicles, and has particular relation to means for bringing the clutch driven gears of a transmission mechanism, to the same speed as that of the gears which move with the drive wheels of the vehicle, whereby the gears may be changed or shifted without endangering them, and irrespective of the speed at which the vehicle may be traveling at the time of the change.

It is an object of the invention to provide a means within the control of the operator of the vehicle, by which the driving-gear, or that actuated by the clutch, may be brought to the same speed as the other gears of the transmission mechanism which are being rotated by the movement of the drive wheels of the vehicle, so that the gears, traveling at the same speed, will readily go into mesh without the danger of stripping them.

It is also an object of the invention to provide a transmission speed controller for the gear which is driven by the clutch mechanism of an automobile, whereby the gears will be caused to travel at the same speed when they are to be shifted and brought into mesh, means also being provided whereby the said speed controller must be operated by the chauffeur or operator, before he can shift the gears.

It is a further object of the invention to provide a motor driven vehicle with a transmission speed controller capable of turning the clutch shaft of the vehicle so as to cause the gear actuated thereby to assume the same speed as the speed of the change gear with which it is to mesh, and to further provide the vehicle with a blocking device for the gear shifting lever whereby the gears which are to mesh must be brought to equal speeds.

With these and other objects in view the invention comprises certain novel constructions, combinations, and arrangements of parts, as will be hereinafter more fully described and claimed.

In the accompanying drawings forming a part of this specification; Figure 1 is a top plan view of a transmission speed controlling mechanism, constructed in accordance with this invention, portions of the vehicle frame being broken away. Fig. 2 is a detail sectional view taken upon line 2—2 of Fig. 1. Fig. 3 is a detail sectional view taken upon line 3—3 of Fig. 1. Fig. 4 is a top plan view of a modified form of transmission speed controlling mechanism, portions of the vehicle frame and mechanism adjacent thereto being also illustrated. Fig. 5 is a top plan view of the rack bar employed for holding the transmission speed controller lever in its adjusted positions, the said lever being shown in section. Fig. 6 is a detail sectional view taken upon line 6—6 of Fig. 5. Fig. 7 is a detail sectional view taken upon line 7—7 of Fig. 4. Fig. 8 is a horizontal sectional view taken through the blocking device employed for controlling the gear shift lever, portions of same being shown in elevation, and the parts being all shown upon an enlarged scale. Fig. 9 is a detail sectional view taken upon the line 9—9 of Fig. 8. Fig. 10 is a vertical transverse sectional view taken upon the line 10—10 of Fig. 8.

The mechanism of the present invention is designed to afford a safety controlling means affecting the movement of the change gears in the transmission mechanism of the ordinary motor driven vehicle, automobile, truck, or the like, so that no matter how rapidly the vehicle may be moving, when it is desired to change gears, the gears which are to be brought into mesh, may be first brought to the same speed whereby the change can be made without danger to the gears. The mechanism is also designed to make it necessary in some instances to use the transmission speed controller before the shift lever can be moved to change the gears. The mechanism is thus adapted to the employment of chauffeurs and operators that are not necessarily experts, since they can not shift the gears in such a manner as to strip or otherwise injure them.

The preferred forms of the invention have been illustrated in the accompanying drawings, and the details and features thereof will now be more specifically described and claimed.

Referring to said drawings 15 indicates the framing of a vehicle, 16 a motor, 17 the usual clutch and 18 the change gear mechanism. These parts are generally of the ordinary construction and are operated in the usual way. The transmission speed controller mechanism is mounted for the most part upon transverse bars 19 and 20 which connect the side bars of the vehicle frame 15. Upon the clutch shaft 21 of the vehicle is a friction disk or wheel 22 having its hub 23 splined upon the said clutch shaft 21. The periphery of the disk or wheel 22 is usually provided with a friction tread portion 24 adapted to engage the face of an adjacent disk 25 which is set in a plane at right angles to the plane of the disk or wheel 22. The said disk 25 is carried by short shaft 26 journaled at its outer end in frame 15 and at its inner end upon a connecting bar 27 which extends from the bar 19 to bar 20. The said shaft 26 is capable of a slight endwise movement so that the disk 25 may be pressed against the periphery of the disk or wheel 22. The said shaft 26 is reciprocated for this purpose by means of a bell crank lever 28 which is fulcrumed at 29 upon the cross bar 20. One arm of the lever 28 is usually shorter than the other and the short arm is connected pivotally with a collar 30 which movably engages a grooved sleeve 31 secured to the said shaft 26. The long arm of the said bell crank lever 28 is connected by a link 32 with an arm 33 which is secured to the pedal shaft 34 of the clutch mechanism 17. When the foot of the operator is pressed against the pedal 35 the shaft will be rocked to withdraw the cone of the clutch from the cup member thereof, and at the same time the arm 33 will be caused to move the bell crank lever 28 and press the disk 25 against the edge of the disk or wheel 22. By connecting the shaft 26 with the drive wheel mechanism, it will be evident that the disk 25 may be caused to rotate the disk or wheel 22 and turn the clutch shaft 21 with its driving gear at a corresponding speed. The shaft of the said disk 25 may be connected with the jack shaft of the ordinary motor truck by sprocket or other gearing, or may be connected directly with the shaft which carries the gear meshing with the differential gear mechanism on the rear shaft of the vehicle.

As shown in Fig. 1, a sprocket wheel 36 secured to the shaft 26, is connected by a sprocket chain 37 with a sprocket wheel 38, mounted upon a transverse shaft 39. The said shaft 39 is journaled at one end in a bracket 40, carried by the rear axle casing, and at the other end in the casing of the change gear mechanism 18. One end of shaft 39 is provided with a bevel gear 41 that meshes with a corresponding bevel gear 42 secured to the drive shaft within the housing of the change gear mechanism. It will thus be evident that as the vehicle moves, when not driven by the engine, as for instance upon a down grade, the shaft 39 will be turned by the beveled gears and motion will be transmitted through the sprocket chain 37 to the shaft 26, and the disk 25 driven thereby, will upon engagement with disk or wheel 22, turn the clutch shaft at a speed in correspondence with the speed of the driving wheels and their shafts.

The speed of the disk or wheel 22 and the clutch shaft with its driving gear should be proportioned to the particular speed gear with which the driving gear is to be brought into mesh. There are generally, two, three or more gears in the change gear mechanism for securing the desired speed in driving the vehicle. The disk or wheel 22 is capable of being changed for accommodating the parts to the speed desired. It will be seen that when the disk or wheel 22 is in the position shown in Fig. 1. that, it will be engaged by the edge portion of disk 25, and will be rotated faster thereby than when it engages said disk nearer to the center thereof. The shaft 21 may thus be driven by shifting the said disk 22 with respect to the face of disk 25, so as to secure the proper speed for the change to low gear, intermediate gear, or high gear, as the case may be. In order to properly move the said disk or wheel 22, its hub is provided with an annular groove which is engaged by a collar 43 and a yoke link 44 pivotally connects the said collar with a lever 45 which is fulcrumed to the frame 15 at 46. A link 47 connects the said lever 45 with an arm 48 which is secured to a rock shaft 49. Said rock shaft 49 is journaled upon the cross bar 19 and a lever 50 secured to the end thereof rocks the said shaft when necessary. The said lever 50 is connected by means of a rod 51 with the blocking mechanism for the change lever, as will be hereinafter more fully described. The said lever 50 is provided with a hand hold at its upper end by which it may be moved and a segmental rack 52 is employed for facilitating the holding of the said lever 50 in its adjusted positions. The said rack may be made of a simple bar with notches in its edges for engaging a projecting rib or tooth 53 carried by the said lever 50, but the said rack is preferably made with adjustable means, as shown in Figs. 4, 5, and 6 whereby the position of the said notches may be varied and adjusted.

As shown in said Figs. 5 and 6 the rack proper 52 is formed with a series of elongated notches 54 set at suitable distances from each other, and notched plates 55, 56 and 57 are adjustably secured upon said rack bar by bolts 58 which engage slots formed in said plates, as clearly shown in Fig. 5. The notches of each of said plates may thus be set in proper position over the notches 54 of the rack bar to hold the hand lever 50 in proper position for each change of speed to be made. If there are three speeds provided for in the change gear mechanism of the motor vehicle, there will be three notches arranged in the edge of the rack bar 52. They will be so positioned that when the hand lever 50 is moved to the notch corresponding with the first, intermediate, or high speed which may be desired in shifting the gears, the disk or wheel 22 will be moved to corresponding distances from the axis of the disk 25, to bring the gears carried by the clutch shaft 21 to the same speed as the gears in the gear box 18 with which the connection is to be made. Thus as shown in Fig. 1. the disk or wheel 22 may be moved opposite to points indicated by the arrows on disk 25. It will be understood of course that the device will be capable of use no matter what the number of speeds the vehicle mechanism may be adjusted to, without departing from the spirit of the invention.

As shown in Fig. 4 of the drawing the disks and their operating means may be arranged in a somewhat different manner within the spirit of the invention. As illustrated in said Fig. 4 the movement of shaft 50 through its rock shaft 49 may be caused to throw a bell crank lever 59 which is fulcrumed at 60 upon a cross bar of the frame. An arm 61 upon the shaft 49 is connected with the said bell crank 59 by a link 62. In this form of the device a short transverse shaft 63 is employed which finds suitable bearings in a yoke frame secured upon the vehicle. Said yoke frame is made up of end yokes 64 and 65 which are connected by rods 66. The inner end of shaft 63 is journaled in an adjustable bearing 67 carried by a yoke block 68, which is fixed upon the adjacent face of the end yoke 65. The said yoke block 68 spans the clutch shaft 21 of the vehicle so as not to interfere with the same in any way, yet offers a firm support to the said bearing 67. The end yoke 65 is rigidly secured to a cross bar 69 which extends therefrom to the side bar of the vehicle frame. The outer end of the shaft 63 carries a sprocket wheel 70 which is connected by a sprocket chain 71 with a sprocket wheel 72. The said sprocket wheel 72 is usually attached to the jack shaft 73 which is commonly employed upon trucks or like vehicles, though the said sprocket wheel 72 may if desired be attached directly to the rear axle of the vehicle. If it is wished to run the mechanism directly by the rear axle, however, it is preferable to arrange the parts as shown in Fig. 1 of the drawing and as hereinbefore described. The shaft 63 will through the connections described thus be driven whenever the vehicle is moving. Splined to the said shaft 63 is a friction disk or wheel 74, the edge of which is adapted to be moved across the face of a corresponding friction disk 75 made fast to the shaft 21. When the shaft 21 is moved longitudinally by the operation of the clutch 17, it can be caused by a continued movement to force the said disk 75 against the periphery of the disk or wheel 74. The bell crank lever 59 is connected by a yoke link 76 with a collar 77 which engages an annular bearing on the hub of the friction disk or wheel 74. The said disk or wheel 74 can thus be moved back and forth upon the shaft 63 so as to be brought opposite the desired points on the disk 75 to secure a proper turning of the shaft 21 and also the transmission of equal speeds to the gears which are to be brought into mesh in making the next change of speeds, when driving the vehicle. The mechanism is also so constructed that if desired, the operator may be forced to set the speed controlling mechanism before he operates the shift lever of the motor vehicle. As shown in Figs. 4, 8, 9 and 10 the lower end of said shift lever 78 may be inclosed in a housing 79. The said housing is usually connected with the side bar of the vehicle frame by a yoke 80. The usual rack 81 of the brake lever 82 may also be supported upon said yoke as shown in Fig. 10. The housing 79 is made to inclose the upper portions of the usual stub levers 83 and 84 commonly employed for shifting the gears in the gear mechanism 18. In the type of stub lever shown in the drawings the upper end of each lever is provided with a forked portion 85 adapted to receive the shift lever 78 when it is bent to one side or the other upon its fulcrum 86 for accomplishing the gear shifting operation. The usual springs 87 are carried by each of the stub levers for normally holding the shift lever 78 in upright central, and neutral position. It will be evident that if means is provided for blocking the movement of the said stub levers, that they may be prevented from shifting the gears until the speed controller has been operated. In the drawing a simple form of blocking mechanism has been shown which usually consists of a series of rock shafts 88 journaled in walls of the said housing 79. Projecting upwardly from each rock shaft 88 is an arm 89 which carries at its upper end a head 90. Each head 90 is of a suitable length to fit in the space between the upper end of the stub lever which it is to block, and a set screw 91 placed in the wall of the housing 79. The said arms 89 are preferably thrown inwardly by light springs 92 so that the heads 90 will normally occupy the spaces adjacent to the stub levers, and prevent their movement until the speed controller mechanism has been set. In order to move the blocking heads 90 out of the way when the shift lever is to be operated for attaining a given speed, a slide frame 93 is movably mounted in guide ways 94 formed in the lower enlarged portion of the housing 79. The said slide frame is connected by means of an adjustable rod 51 with the lever 50 of the speed controller mechanism, as clearly shown in Fig. 9. The said slide frame 93 is provided with a number of cam pieces 96 which are secured upon the slide by bolts 97 engaging slots 98 formed in the said frame 93. The inner edges of said cam pieces 96 are tapered as shown in Fig. 8, so that when they are brought opposite depending arms 99 carried by the rock shafts 88, they will rock said shafts sufficiently to withdraw the heads 90 from their positions opposite the upper ends of the stub levers. The movement of the heads 90 will be readily understood from the positions thereof indicated in full and dotted lines in Fig. 8 of the drawings. As shown in said Fig. 8 the mechanism is adapted for the shifting of the gears to attain three different speeds, and a corresponding number of blocking pieces are employed, one being shown as thrown out of blocking position to permit the movement of one of the stub levers 33, in obtaining the change of gears, preparation for which has been made by the operation of the lever 50 of the speed controller. It will be observed that the cam 96 which is opposite the withdrawn blocking head, is opposite the arm 99 upon the rock shaft thereof. The other cams 96 are at the same time in distant positions with respect to their arms 99. The shifting of the frame 93 by the movement of lever 50, will however bring them into proper position for throwing out the corresponding blocking devices at the proper time. It will thus be observed that the movement of the hand lever 50 to arrange the friction disks in proper relation to bring the gears to equal speeds, will also throw out the proper blocking device to permit a right operation of the shift lever for obtaining the desired speed in the movement of the vehicle. The coöperation between the mechanisms thus prevents the shifting of the gears so that any but the ones which have been brought to the same speed can not be thrown into mesh.

It will be evident that many minor details in the construction of the mechanism may be varied and altered within the spirit and scope of this invention. In the operation of the mechanisms shown when it is desired to change the transmission gears for one speed or another, the lever 50 is set so as to make things in readiness for turning the driving gear at the same speed that the gear to be driven is moving, when the change is made. This will move the friction disks into proper position with relation to each other and will also set the blocking devices to release the proper stub lever. A pressure upon the foot lever of the clutch will of course first release the engine shaft and then a further pressure thereon will cause the two disks to be brought together and the speed with which the clutch shaft is turning will be changed to that of the speed with which the gear, next to be used in the transmission mechanism, is being turned by the movement of the vehicle, and the corresponding turning of the rear shaft, and also the jack shaft in the case of a truck.

The device is especially useful upon motor trucks and heavy vehicles and prevents injury to the shifting mechanism, especially when operators or drivers who have no great experience are employed. The device is of course readily adapted to any kind of a motor driven vehicle, and when placed upon vehicles of the lighter sort or passenger vehicles of any kind, the connection with the rear axle is preferably made as shown in Fig. 1 and the sprocket gears are set within the vehicle frame.

What is claimed is:

1. A transmission speed controlling mechanism comprising in combination with driving gears, driven gears, friction disks connected with said driving and driven gears, one of said disks being capable of edge-wise engagement with the other and movable across the face thereof for varying the speed of the gears to facilitate their meshing at equal speeds, when the gears are to be changed.

2. A transmission speed controlling mechanism comprising in combination with driving and driven gears, friction disks, one of which is connected with the driving gears, while the other is connected with the driven gears, means for moving one gear to points at different distances from the axis of the other gear, whereby different speeds will be attained, and the driving and driven gears which are to mesh will be brought to equal speeds, and means for shifting said gears.

3. A transmission speed controlling mechanism for motor driven vehicles comprising in combination with a clutch shaft, a clutch controlling the same, means for operating the clutch, a disk adapted to be turned by said clutch shaft, a coöperating disk, means for driving said coöperating disk from the driving wheels of the vehicle, and means for adjusting the disks with respect to each other for turning the clutch shaft when the clutch is disconnected whereby the gears of the transmission mechanism will be brought to equal speeds when they are to be thrown into mesh.

4. A transmission speed controlling mechanism for vehicles comprising in combination with a clutch shaft, gears connected therewith, a vehicle propelling shaft, gears connected therewith, a disk connected with said propelling shaft, a disk connected with said clutch shaft, means for setting the disks in different relations to each other and means for forcing them together, whereby the gears of the clutch shaft will be brought to a suitable speed with respect to the gears of the propelling shaft for facilitating the changes of gearing and speed in driving the vehicle.

5. A transmission speed controlling mechanism comprising disks connected with the clutch shaft and the propelling shaft of a vehicle, the said disks being arranged in planes at right angles to each other, whereby the periphery of one disk may be brought against the face of the other for communicating movement thereto, a set lever for moving the disks with respect to each other, an adjustable rack plate adapted to hold the set lever in given positions preparatory to the changing of gears on the vehicle, and means for forcing the disks together in unifying the speeds of the gears to be brought into mesh preparatory to the changing of gears.

6. A transmission speed controlling mechanism comprising in combination with the driving gears of the transmission and the driven gears thereof, of coöperating friction members adapted to cause the gears to turn at equal speeds, and set means for moving said friction members to attain different speeds, a shift lever controlling device also operated by said set means and means operated thereby for preventing the shifting of the gears until the speed controlling mechanism has been properly set.

7. A transmission speed controlling mechanism comprising in combination with the driving gears and the driven gears of the transmission mechanism, of coöperating friction disks adapted to cause the transmission gears to turn at equal speeds, a blocking mechanism for the shift lever of the transmission comprising movable block members adapted to hold the shifting lever mechanism, a cam member for controlling said block members and a lever for operating said cam member, said lever being also employed for regulating the relation of the friction disks with respect to each other.

8. A transmission speed controlling mechanism comprising in combination with the driving gears and the driven gears of the transmission mechanism, of coöperating friction members adapted to cause the movement of the said transmission gears at equal speeds, a blocking device for the shift lever mechanism of the transmission, comprising a housing inclosing the stub shift levers, spring actuated blocking members adapted to prevent the movement of the said shift levers, a cam slide having cams thereon capable of moving the blocking members out of engagement with said shift levers, and a lever for moving said cam slide, said lever being also connected with and controlling the positions of the coöperating friction members, the structure being such that the friction members must first be set to cause the gears which are to mesh, to move at equal speeds before the shift lever mechanism can shift the gears and change the speed of the vehicle, carrying the transmission mechanism.

In testimony whereof I have hereunto set my hand in presence of two witnesses.

FREDERICK W. WOODHULL.

Witnesses:
CASSELL SEVERANCE,
EARLE R. POLLARD.